United States Patent
Black et al.

(10) Patent No.: US 9,303,507 B2
(45) Date of Patent: Apr. 5, 2016

(54) DOWN HOLE WIRELESS DATA AND POWER TRANSMISSION SYSTEM

(71) Applicant: Saudi Arabian Oil Company, Dhahran (SA)

(72) Inventors: Michael John Black, Dhahran (SA); Brett Wayne Bouldin, Dhahran (SA); Mohamed N. Noui-Mehidi, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 359 days.

(21) Appl. No.: 14/044,893

(22) Filed: Oct. 3, 2013

(65) Prior Publication Data
US 2014/0210634 A1    Jul. 31, 2014

Related U.S. Application Data

(60) Provisional application No. 61/759,302, filed on Jan. 31, 2013.

(51) Int. Cl.
*G01V 3/00* (2006.01)
*E21B 47/12* (2012.01)
*E21B 17/00* (2006.01)
(Continued)

(52) U.S. Cl.
CPC ............ *E21B 47/122* (2013.01); *C08J 7/00* (2013.01); *E21B 17/003* (2013.01); *E21B 17/1085* (2013.01); *E21B 47/12* (2013.01); Y10T 428/24802 (2015.01)

(58) Field of Classification Search
CPC ....... E21B 47/00; E21B 47/12; E21B 47/122; E21B 47/123; E21B 15/00; E21B 17/00; E21B 17/003; E21B 17/206; E21B 41/0085; E21B 41/0092

USPC .......................................... 340/853.1–856.4
See application file for complete search history.

(56) References Cited

U.S. PATENT DOCUMENTS 6,098,727 A    8/2000   Ringgenberg et al.
6,628,206 B1   9/2003   Soulier
(Continued)

FOREIGN PATENT DOCUMENTS

WO    92/03509 A1    3/1992
WO    01/55555 A1    8/2001
(Continued)

OTHER PUBLICATIONS

PCT The International Search Report and the Written Opinion of the International Searching Authority dated Nov. 11, 2014; International Application No. PCT/US2014/013589; International File Date: Jan. 29, 2014.
(Continued)

*Primary Examiner* — Steven Lim
*Assistant Examiner* — Ryan Sherwin
(74) *Attorney, Agent, or Firm* — Bracewell LLP; Constance Gall Rhebergen; Brad Y. Chin

(57) ABSTRACT

This present invention generally relates to the issue of signal obstruction in down hole applications. This invention relates to conformal coatings and down hole transmission systems to aid in transmission of wireless signals down hole. The conformal coating includes a substrate material that has an array of rods embedded therein. These embedded rods are made of a Mie Resonance based dielectric material.

21 Claims, 2 Drawing Sheets

(51) Int. Cl.
*E21B 17/10* (2006.01)
*C08J 7/00* (2006.01)

(56) References Cited

U.S. PATENT DOCUMENTS

| | | | |
|---|---|---|---|
| 6,766,141 B1 * | 7/2004 | Briles | G01S 13/756 |
| | | | 340/853.1 |
| 7,080,699 B2 | 7/2006 | Lovell et al. | |
| 7,170,007 B2 | 1/2007 | Varkey et al. | |
| 7,207,396 B2 * | 4/2007 | Hall | E21B 47/122 |
| | | | 175/40 |
| 7,424,911 B2 | 9/2008 | McCarthy et al. | |
| 7,550,097 B2 | 6/2009 | Tonapi et al. | |
| 7,586,042 B2 | 9/2009 | Varkey et al. | |
| 7,794,629 B2 | 9/2010 | Youngs et al. | |
| 7,880,640 B2 | 2/2011 | Lovell et al. | |
| 8,227,697 B2 | 7/2012 | Varkey et al. | |
| 8,242,928 B2 | 8/2012 | Prammer | |
| 8,354,939 B2 | 1/2013 | McDaniel et al. | |
| 8,660,595 B2 * | 2/2014 | Jensen | E21B 17/003 |
| | | | 340/854.4 |
| 2007/0201308 A1 * | 8/2007 | Wassermann | G01V 11/002 |
| | | | 367/82 |
| 2007/0247330 A1 | 10/2007 | Clark | |
| 2010/0110559 A1 | 5/2010 | Cai et al. | |
| 2010/0149056 A1 | 6/2010 | Contant et al. | |
| 2011/0133568 A1 | 6/2011 | Wang et al. | |
| 2011/0140807 A1 | 6/2011 | Ryu et al. | |
| 2011/0156639 A1 | 6/2011 | Ryu et al. | |
| 2012/0038219 A1 | 2/2012 | Wang et al. | |
| 2012/0126993 A1 | 5/2012 | Samson et al. | |
| 2012/0154168 A1 | 6/2012 | Duncan et al. | |
| 2012/0176138 A1 | 7/2012 | Prammer | |
| 2012/0224801 A1 | 9/2012 | Laing et al. | |
| 2012/0274477 A1 | 11/2012 | Prammer | |
| 2013/0032411 A1 | 2/2013 | John et al. | |
| 2014/0176334 A1 * | 6/2014 | Benedict | G01V 3/34 |
| | | | 340/854.4 |

FOREIGN PATENT DOCUMENTS

| | | |
|---|---|---|
| WO | 01/59258 A1 | 8/2001 |
| WO | 2004/033847 A1 | 4/2004 |
| WO | 2010/120187 A1 | 10/2010 |

OTHER PUBLICATIONS

Cai, Wenshan, et al., Designs for optical cloaking with high-order transformations, Optics Express, Apr. 14, 2008, pp. 5444-5452, vol. 16, No. 8, USA.

Gaillot, Davy P., et al., An all-dielectric route for terahertz cloaking, Optics Express, Mar. 17, 2008, pp. 3986-3992, vol. 16, No. 6, USA.

Zhao, Qian, et al., Mie resonance-based dielectric metamaterials, Materials Today, Dec. 2009, pp. 60-69, vol. 12, No. 12.

\* cited by examiner

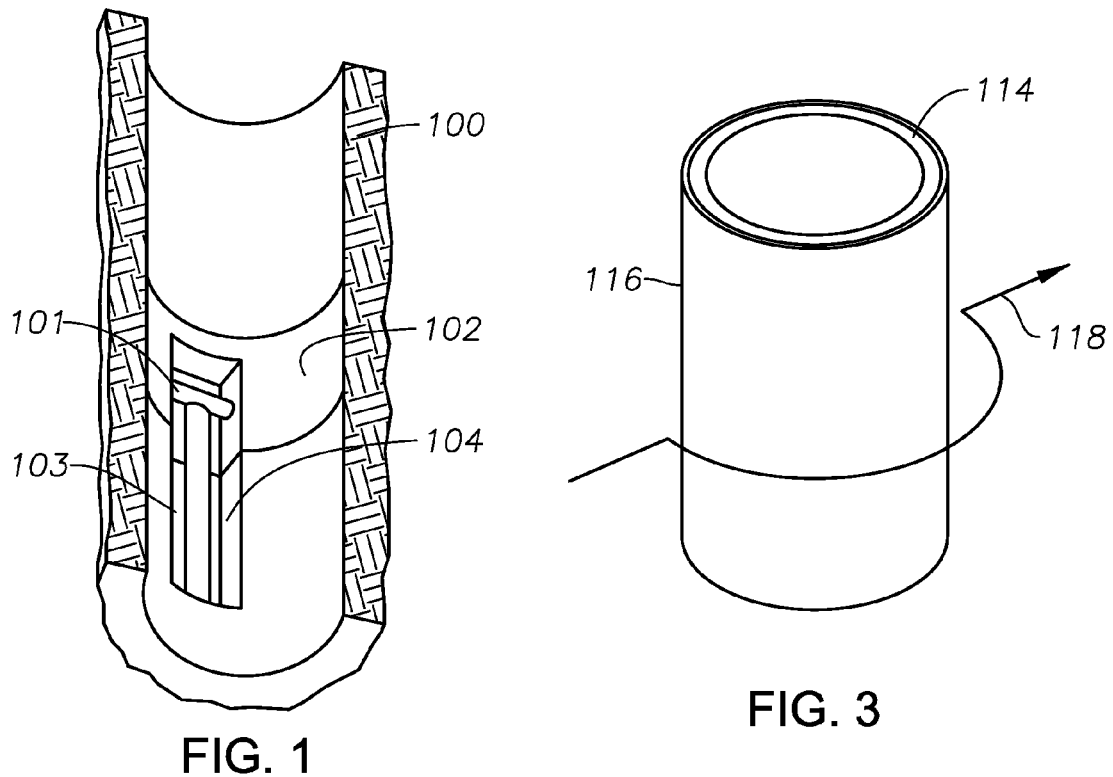
FIG. 1
FIG. 3
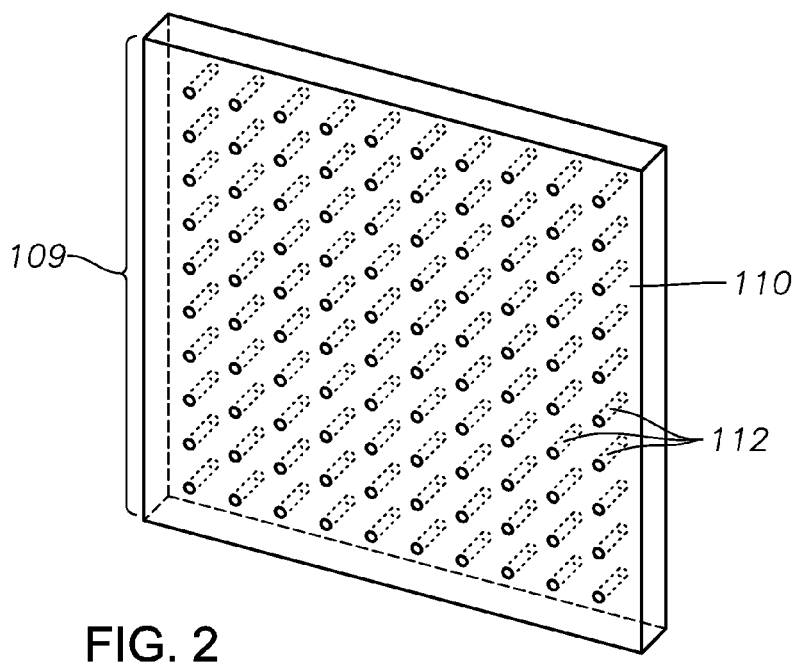
FIG. 2

DOWN HOLE WIRELESS DATA AND POWER TRANSMISSION SYSTEM

The present application relates to, claims the benefit of, and claims priority to U.S. Provisional Patent Application Ser. No. 61/759,302, filed Jan. 31, 2013, titled "Down Hole Wireless Data and Power Transmission System," and which is incorporated herein in its entirety.

FIELD OF INVENTION

This present invention generally relates to the issue of signal obstruction in down hole applications. This invention generally relates to conformal coatings and down hole transmission systems to aid in transmission of signals down hole. The present invention relates to conformal coatings which can be used to optimize the transmission of electromagnetic waves in down hole conditions.

BACKGROUND

Objects down hole, including metallic and ferromagnetic objects, as well as down hole geometries, can obstruct the transmission path from a transmitter antenna to a receiver antenna. External sources can provide means by which electromagnetic waves are transmitted wirelessly either to transmit data or power. However, a problem exists such that these wireless signals can be strongly attenuated by the presence of metallic tools or completion hardware, as well as down hole geometries. Therefore, there is a need for developments that will allow the transmitted wireless wave to bend around the obstructing metallic object or geometric obstacles, thereby maximizing transmission efficiency of wireless communications in down hole applications.

SUMMARY OF THE INVENTION

This present invention generally relates to the issue of signal obstruction in down hole applications. This invention generally relates to conformal coatings and down hole transmission systems to aid in transmission of wireless signals down hole.

In some aspects, the present invention provides a conformal coating suitable for application onto production pipe for use in a wellbore. The conformal coating is operable to bend signals around production pipe in a wellbore. The conformal coating includes a substrate material that has an array of rods embedded therein. These embedded rods are made of a Mie Resonance based dielectric material. The substrate material having an array of rods embedded therein is operable to conform to a wall of a pipe for use in a cased hole.

In other aspects, the present invention provides a transmission system that includes a conformal coating that includes a substrate material that has an array of rods embedded therein. The embedded rods include a Mie Resonance based dielectric material. The transmission system also has a down hole monitoring system with a receiver antenna. The transmission system also has a transmitter antenna. The transmission system further includes a surface monitoring system.

In other embodiments, the present invention provides a down hole apparatus for use in transmitting signals, which is coated in a conformal coating. The conformal coating is operable to bend signal around obstructions that impede transmission of signals. The conformal coating includes a substrate material. In some embodiments, the substrate material has a dielectric constant of about 2.1. The substrate material has an array of rods embedded therein. The embedded rods include a Mie Resonance based dielectric material.

The effect of the conformal coating is to maximize the transmission range for wireless power and data transmission. In turn, this will reduce the complexity of down hole tools thereby reducing operating and installation costs. This will allow both reservoir engineers and production engineers to transmit and receive wireless data and telemetry at increased efficiency.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

FIG. 1 shows an embodiment of a wireless down hole monitoring system.

FIG. 2 shows an embodiment of conformal coating.

FIG. 3 shows an embodiment of a conformal coating around the outside of the pipe that is operable to bend transmissions around the pipe.

DETAILED DESCRIPTION

Figure 4:
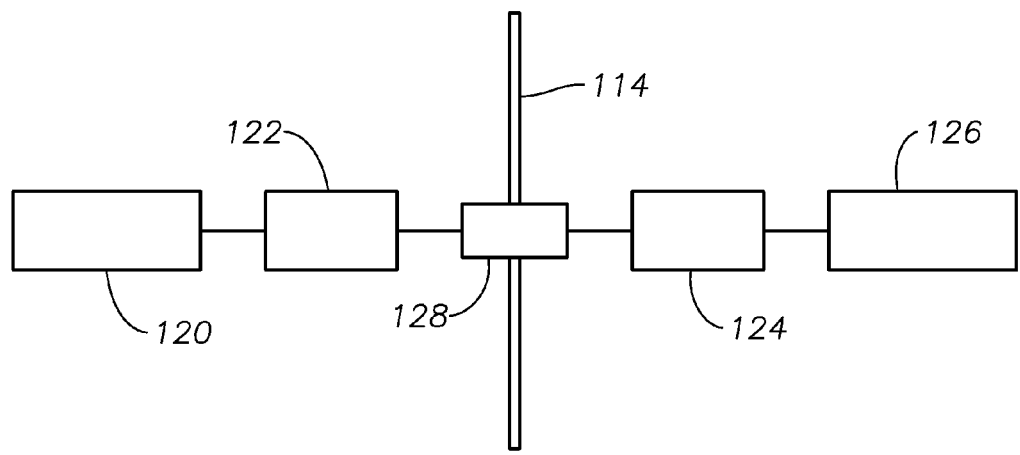
FIG. 4 shows a block diagram of exemplary embodiments of the invention.

This present invention generally relates to the issue of signal obstruction in down hole applications. This invention generally relates to conformal coatings and down hole transmission systems to aid in transmission of wireless signals down hole.

In some aspects, the present invention provides a conformal coating suitable for application onto production pipe for use in a wellbore. The conformal coating is operable to bend signals around production pipe in a wellbore. The conformal coating includes a substrate material. In some embodiments, the substrate material has a dielectric constant of about 2.1. The substrate material also has an array of rods embedded therein. These embedded rods are made of a Mie Resonance based dielectric material. The substrate material having an array of rods embedded therein is operable to conform to a wall of a pipe for use in a cased hole.

In some embodiments, the conformal coating is applied to the inside of a wellbore 100 as shown in FIG. 1, thereby allowing transmission around an occluding edge, such as a bend, or other geometric obstacles, in the wellbore. As shown in FIG. 1, the wellbore 100 has a conformal coating 102 applied thereto. Within the wellbore is a recess, or occlusion, 104. The down hole monitoring system 103, including receiver antenna 101, are placed within the recess. In some embodiments, the conformal coating coats the entire recess. In other embodiments, the conformal coating coats the outer regions of the recess. In further embodiments, the conformal coating coats only portions of the recess. In further embodiment, the conformal coating coats regions of the wellbore near the recess. A person of skill in the art can select the optimal position of the conformal coating within a wellbore based on the geometries of the wellbore and the region in which wireless signals are to be transmitted. In general, the conformal coating is applied at the regions within the wellbore where facilitation of wireless signals from a transmitter antenna to a receiver antenna is needed for a given application.

In some embodiments, the conformal coating is applied to an inner surface of pipe, such as a recess, or occlusion, in the corner of a side pocket within the production pipe. In further embodiments, the production pipe includes a side pocket mandrel. In general, any production pipe with side pockets can be employed in this particular embodiment of the invention.

Another embodiment of the conformal coating is shown in FIG. 2. As shown in FIG. 2, which is an example of such a conformal coating 109 in planar form, the substrate 110 has rods 112 embedded therein.

In principle, the coating is used to cover any object which is operable to block wireless transmission at a particular frequency in down hole operations. Such objects include pipe and down hole tools, as well as geometric obstacles within the wellbore. In some embodiments, the conformal coating will be pliable at ambient or near ambient conditions such that it is applied to objects under such conditions. In other embodiments, the conformal coating is preformed to predetermined shapes and sizes. In further embodiments, the conformal coating is heat preformed to predetermined shapes and sizes.

In other aspects, the invention provides a transmission system that includes a conformal coating. The conformal coating has a substrate that has an array of rods embedded therein. The embedded rods are a Mie Resonance based dielectric material. The transmission system also includes a down hole monitoring system that has a receiver antenna. The transmission system also includes a transmitter antenna and a surface monitoring system.

In a further embodiment, the down hole monitoring system is installed in a first recess in a side of the down hole pipe and the transmitter antenna is installed in a second recess in a side of the down hole pipe. The conformal coating is applied in the wellbore such that transmission of signals is facilitated from the transmitter antenna to the down hole monitoring system. In some embodiments, the conformal coating is applied to the wellbore based on the geometries of a given region, such that issues with wireless signal transmission in a wellbore are reduced based on the location of application of the conformal coating.

In other embodiments, the present invention provides a transmission system including a down hole pipe having a conformal coating on an inner surface. The conformal coating includes a substrate material. In some embodiments, the substrate material may have a dielectric constant of about 2.1. The substrate has an array of rods embedded therein. The embedded rods include a Mie Resonance based dielectric material. The transmission system also has a down hole monitoring system with a receiver antenna. The transmission system also has a transmitter antenna. The transmission system further includes a surface monitoring system.

By placing the down hole monitoring system in a recess, the flow of materials through the production pipe is not obstructed, or is minimally obstructed, by the down hole monitoring system.

In some embodiments, the transmitter antenna is deployed as a separate wire line tool directly in the flow or in a second recess in a different position within the production tubing.

In further embodiments, the conformal coating is operable to bend radiation from the transmitter antenna to the receiver antenna such that losses associated with a signal blockage in a transmission path are reduced. In further embodiments, the conformal coating is operable to bend radiation from the transmitter antenna to the receiver antenna such that losses associated with a signal blockage in a transmission path are reduced by at least 10%. In further embodiments, the conformal coating is operable to bend radiation from the transmitter antenna to the receiver antenna such that losses associated with a signal blockage in a transmission path are reduced by at least 20%. In further embodiments, the conformal coating is operable to bend radiation from the transmitter antenna to the receiver antenna such that losses associated with a signal blockage in a transmission path are reduced by at least 30%. In further embodiments, the conformal coating is operable to bend radiation from the transmitter antenna to the receiver antenna such that losses associated with a signal blockage in a transmission path are reduced by at least 40%. In further embodiments, the conformal coating is operable to bend radiation from the transmitter antenna to the receiver antenna such that losses associated with a signal blockage in a transmission path are reduced by at least 50%. In further embodiments, the conformal coating is operable to bend radiation from the transmitter antenna to the receiver antenna such that losses associated with a signal blockage in a transmission path are reduced by at least 75%. In further embodiments, the conformal coating is operable to bend radiation from the transmitter antenna to the receiver antenna such that tosses associated with a signal blockage in a transmission path are reduced by at least 90%. In further embodiments, the conformal coating is operable to bend radiation from the transmitter antenna to the receiver antenna such that losses associated with a signal blockage in a transmission path are reduced by at least 95%. In further embodiments, the conformal coating is operable to bend radiation from the transmitter antenna to the receiver antenna such that losses associated with a signal blockage in a transmission path are reduced by at least 99%.

In further embodiments, the substrate material of the conformal coatings is about 0.05 to 1.0 inches (0.127 to 2.54 cm) thick, In other embodiments, the substrate material of the conformal coatings is 0.1 to about 0.5 inches (0.254 to 1.27 cm) thick. In other embodiments, the substrate material of the conformal coating is about 0.5 inches (1.27 cm) thick. In other embodiments, the substrate material of the conformal coatings is about 0.1 inches (0.254 cm) thick. In other embodiments, the substrate material of the conformal coating is about 0.05 inches (0.127 cm) thick. In other embodiments, the substrate material of the conformal coatings is about 1.0 inches (2.54 cm) thick. Dimensions for thickness of the conformal coating may be influenced by properties of the selected substrate material, surrounding geometries in a specific down hole application and transmission frequencies to be utilized in a given application.

In further embodiments, the rods are about 0.05 to 0.75 inches (0.127 to 1.905 cm) in diameter. In other embodiments, the rods are about 0.1 to about 0.5 inches (0.254 to 1.27 cm) in diameter. In other embodiments, the rods are about 0.05 inches (0.127 cm) in diameter. In other embodiments, the rods are about 0.75 inches (1.905 cm) in diameter. In other embodiments, the rods are about 0.5 inches (1.27 cm) in diameter. In other embodiments, the rods are about 0.1 inches (0.254 cm) thick in diameter. Dimensions for diameter of rods may be influenced by the properties of the material selected for the rods, surrounding geometries in a specific down hole application and transmission frequencies to be utilized in a given application, In further embodiments, the axes of the rods will be normal to the surface coated with the conformal coating.

In further embodiments, the rods are spaced about 0.3 to 0.6 inches (0.762 to 1.524 cm) apart. In some embodiments, the rods are spaced about 0.3 inches (0.762 cm) apart, in some embodiments, the rods are spaced about 0.4 inches (1.016 cm) apart. in some embodiments, the rods are spaced about 0.5 inches (1.27 cm) apart. In some embodiments, the rods are spaced about 0.6 inches (1.524 cm) apart. In further embodiments, the rods are arranged in a repeating, regular pattern, such as a square array, a triangular array, and a hexagonal array. Dimensions for spacing and pattern of rods may be influenced by the properties of the material selected for the rods, surrounding geometries in a specific down hole application and transmission frequencies to be utilized in a given application.

In other embodiments, the present invention provides a down hole apparatus for use in transmitting signals, which includes a down hole device coated in a conformal coating. The conformal coating is operable to bend signal around obstructions that impede transmission of signals. The conformal coating includes a substrate material. In some embodiments, the substrate material has a dielectric constant of about 2.1. The substrate material has an array of rods embedded therein. The embedded rods include a Mie Resonance based dielectric material.

In further embodiments, the down hole device is a down hole tool. In further embodiments, the down hole device is a pipe.

Any Mie Resonance based dielectric material can be used in the embodiments described herein. In further embodiments, the Mie Resonance based dielectric material is silicon carbide. In some embodiments, the Mie Resonance based dielectric material has a high relative permittivity.

In further embodiments, the dielectric constant of the Mie Resonance Material ranges from about 1.8 to 2.2. In further embodiments, the dielectric constant of the Mie Resonance Material is about 2.0. In further embodiments, the dielectric constant of the Mie Resonance Material is about 2.1.

In further embodiments, the substrate is tetrafluoroethylene. Any material useful for the invention can be used at the substrate material. In some embodiments, the substrate material has a low relative permittivity.

Generally, embodiments of the invention will be operable to enable efficient wireless transfer of electromagnetic waves in down hole conditions thereby maximizing the range of wireless transmission systems, primarily in cased hole configurations. However, the same technology could also be used in an open hole scenario where the line of sight between transmitter and receiver is blocked by the presence of a down hole tool or by geometric obstacles.

The embodiments of the present invention are operable to be used primarily with RF frequencies and above. However, the materials of the present invention can be selected such that they are suitable for use with any particular frequency which may be used in down hole applications.

In some embodiments, the conformal coating has the effect of being an "invisibility cloak" for a particular frequency. In some embodiments, effect of such a coating on a down hole tubing at high frequency (such as at about 0.58 THz) would be to allow transmission to bend as shown in FIG. 3. As shown in FIG. 3, production tubing 114 is coated with conformal coating 116. The conformal coating 116 allows transmission of a signal 118 around the production tubing. Such a coating could be applied to any tools or apparatus intended for down hole use.

FIG. 4 shows exemplary embodiments of the present invention. An embodiment of the present invention is a down hole monitoring system 120 including a receiver antenna 122, a transmitter antenna 124, and a surface monitoring system 126. Transmission 128 of a given signal will either occur through a line of notch in a recess that allows for ease of transmission of the signal between the transmitter antenna and receiver antenna or through use of a conformal coating to bend transmission 128 around obstructions down hole.

Figure 5:
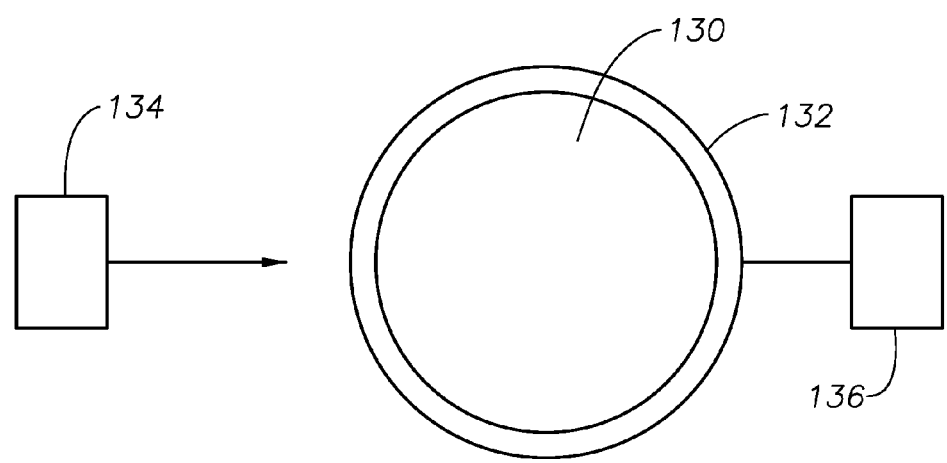
FIG. 5 shows an embodiment of a down hole tool coated in conformal coating.

FIG. 5 shows an embodiment of the invention wherein a down hole tool is coated with conformal material. As shown in FIG. 5, down hole tool 130 is coated with a conformal coating 132. This allows a signal to be transmitted from a transmitter antenna 134 to a receiver antenna 136. The presence of the conformal coating means that the transmitted signal is not blocked by the body of the tool, and the receiver antenna can receive signals as if the tool is not present. In some embodiments, both the transmitter antenna and the receiver antenna are located on the same down hole tool. In other embodiments, the transmitter and receiver antenna are not located on the same object.

An embodiment of the invention is use of the conformal coatings to "cloak" down hole completions with a dielectric conformal coating tuned to a particular frequency of EM wave. This would allow interrogation of a reservoir without interference from completion hardware at a particular frequency.

In general, embodiments of the present invention include integrated selection of materials for the conformal coatings, selection of appropriate wavelengths for transmissions, design of accommodating well hardware (e.g. location of application of conformal coating, placement of transmission and receiver devices), and transmission means. The selection of each of these features is dependent on the others. For example, if a specific wavelength is needed for transmission, this will provide insight into the appropriate materials for the conformal coatings, as well as the transmission means to be used, and appropriate selection of accommodating well hardware.

Therefore, the present invention is well adapted to attain the ends and advantages mentioned as well as those that are inherent therein. The particular embodiments disclosed above are illustrative only, as the present invention may be modified and practiced in different hut equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. in particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A conformal coating suitable for application onto production pipe for use in a wellbore, the conformal coating operable to bend signal around production pipe in a wellbore, the conformal coating comprising:
   a substrate material;
   the substrate material having an array of rods embedded therein,
   the embedded rods comprising a Mie Resonance based dielectric material;
   the substrate material having an array of rods embedded therein is operable to conform to a wall of a pipe for use in a cased hole, wherein the conformal coating is operable to cloak the pipe to reduce signal loss in a transmission path.

2. The coating of claim 1 wherein the substrate material has a dielectric constant of about 2.1.

3. The coating of claim 1 wherein the pipe includes a side pocket mandrel.

4. The coating of claim 1 wherein the substrate material is about 0.1 to about 0.5 inches thick.

5. The coating of claim 1 wherein the rods are about 0.1 to about 0.5 inches in diameter.

6. The coating of claim 1 wherein the rods are spaced about 0.5 inches apart.

7. The coating of claim 1 wherein the Mie Resonance based dielectric material is silicon carbide.

8. The coating of claim 1 wherein the substrate material is tetrafluoroethylene.

9. A transmission system comprising:
   a conformal coating comprising a substrate, the substrate having an array of rods embedded therein, the embedded rods comprising a Mie Resonance based dielectric material;
   a down hole monitoring system comprising a receiver antenna;
   a transmitter antenna; and
   a surface monitoring system, wherein the conformal coating is operable to bend radiation to cloak a pipe to reduce signal loss in a transmission path.

10. The transmission system of claim 9 wherein
    the pipe is a down hole pipe;
    the down hole monitoring system is installed in a first recess in a side of the down hole pipe;
    the transmitter antenna is installed in a second recess in a side of the down hole pipe; and
    the conformal coating is applied in a wellbore such that transmission of signals is facilitated from the transmitter antenna to the down hole monitoring system.

11. The transmission system of claim 9 wherein the conformal coating is operable to bend radiation from the transmitter antenna to the receiver antenna such that losses associated with a signal blockage in a transmission path is reduced.

12. The method of claim 11 wherein the substrate is about 0.1 to about 0.5 inches thick.

13. The method of claim 11 wherein the rods are about 0.1 to about 0.5 inches in diameter.

14. The method of claim 11 wherein the rods are spaced about 0.5 inches apart.

15. The method of claim 11 wherein the Mie Resonance based dielectric material is silicon carbide.

16. The method of claim 11 wherein the substrate is tetrafluoroethylene.

17. A down hole apparatus for use in transmitting signals, comprising
    a down hole device coated in a conformal coating;
    the conformal coating operable to bend signal around obstructions that impede transmission of signals;
    a substrate material having an array of rods embedded therein;
    the embedded rods comprising a Mie Resonance based dielectric material, wherein the conformal coating is operable to cloak the down hole device.

18. The down hole apparatus of claim 17 wherein the down hole device is a down hole tool.

19. The down hole apparatus of claim 17 wherein the down hole device is a pipe.

20. The method of claim 17 wherein the Mie Resonance based dielectric materials is silicon carbide.

21. The method of claim 17 wherein the substrate material is tetrafluoroethylene.

* * * * *